Patented Jan. 22, 1924.

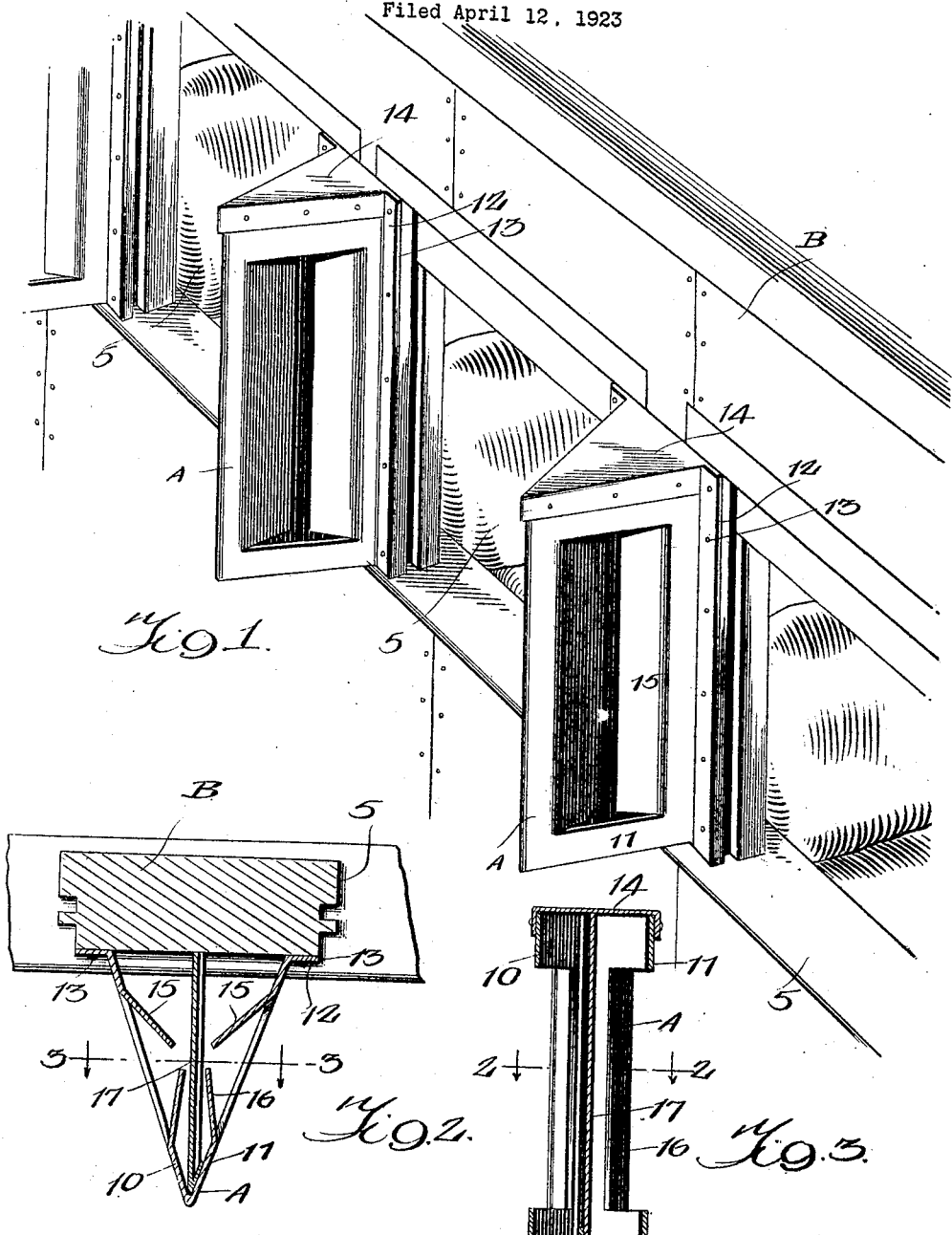

1,481,394

UNITED STATES PATENT OFFICE.

EARNEST J. SIMPSON, OF GASTONIA, NORTH CAROLINA.

RAILROAD-CAR ATTACHMENT.

Application filed April 12, 1923. Serial No. 631,690.

*To all whom it may concern:*

Be it known that I, EARNEST J. SIMPSON, a citizen of the United States, residing at Gastonia, in the county of Gaston and State of North Carolina, have invented certain new and useful Improvements in a Railroad-Car Attachment, of which the following is a specification.

This invention relates to attachments for railroad cars and the primary object of the invention is to provide a novel device for intercepting cinders, grit and the like during the travel of a railroad car, and thereby permit persons to sit near an open car window with comfort.

Another object of the invention is to provide a novel attachment for passenger coaches of railroad trains embodying cinder, grit and the like traps for effectively preventing the entrance of cinders, dirt, grit and the like into the open windows of passenger coaches, the said traps also acting as wind breaks for the passenger coach.

A further object of the invention is to provide means projecting laterally from the sides of a passenger coach and disposed in the path of the wind stream for directing the wind stream downward and away from the car windows, thereby effectively preventing the entrance of wind, dust, dirt and the like into the open windows of a passenger coach.

A still further object of the invention is to provide an improved device of the above character, which will be durable and efficient in use, one that will be simple and easy to manufacture, and one which can be placed upon the market and incorporated with a passenger coach at a minimum cost.

With these and other objects in view, the invention consists in the novel construction, arrangement and formation of parts, as will be hereinafter more specifically described, claimed and illustrated in the accompanying drawings, in which drawings:

Figure 1 is a perspective view of a fragment of a passenger coach showing the improved attachments applied thereto.

Figure 2 is a transverse section through the attachment taken on the line 2—2 of Figure 3, showing the attachment applied to a passenger coach.

Figure 3 is a vertical section taken through the improved attachment on the line 3—3 of Figure 2.

Referring to the drawings in detail, wherein similar reference characters designate corresponding parts throughout the several views, the letter A generally indicates the improved attachment and B a passenger coach with which it can be associated.

The passenger coach B is of course of the ordinary or any preferred construction and each attachment is disposed between a pair of windows 5 thereof. The attachment A can be formed of any preferred material such as sheet metal or the like and embodies the side plates 10 and 11, which are arranged at an angle to each other so that the same converge at their outer ends. Thus the attachment when viewed in horizontal cross section or plan and is of a substantial triangular configuration. The inner ends of the side walls 10 and 11 are provided with outwardly extending attaching flanges 12, which can be connected by means of suitable fastening elements 13 to the frame of the car intermediate the car window 5, as heretofore stated. A suitable top wall 14 can be connected to the side walls 10 and 11 if so desired so as to act as a reinforcing member therefor. Owing to the shape of the walls 10 and 11 it is obvious that the same will have a tendency to shift the wind away from the windows. In order to permit the directing of the sand, grit, cinders and the like downward and away from the windows, each of the walls 10 and 11 have struck out therefrom inwardly directed vanes or guide wings 15 and 16. These wings 15 and 16 extend in toward the center of the attachment and it is obvious that the wind will be directed inwardly and then downwardly through the attachment, which will carry all sand, grit, cinders and the like with the same. In order to prevent the wind from blowing all the way through the attachment, a partition plate 17 is provided. The partition plate 17 extends inwardly from the point of connection of the walls 10 and 11 to the frame of the window of the car B as clearly shown in Figure 2 of the drawings. If so desired, the lower edge of the partition 17 can be provided with outwardly extending flanges 18 for directing the sand, grit, cinders and the like wind outwardly in opposite directions.

It is preferred to leave the lower end of the attachment open as shown in Figure 3 of the drawings.

From the foregoing description it can be seen that I have provided an exceptionally simple and durable device for preventing the entrance of wind, dirt, cinders and the like into the open window of passenger coaches when a train is in motion.

Changes in details may be made without departing from the spirit or scope of this invention.

What I claim as new is:

1. The combination with a passenger coach having windows formed therein, of a device for preventing the entrance of grit and the like into the open windows embodying a casing of substantial triangular configuration in cross section disposed between the windows for deflecting the wind away from the windows having oppositely inclined struck in vertically disposed guide wings, as and for the purpose specified.

2. The combination with a car having windows formed therein, of a device for preventing the entrance of air, dirt and the like into the open windows embodying a casing of substantial triangular configuration in cross section secured to the car between the windows, said casing having vertically disposed struck in wings for catching and directing the wind downwardly and away from the windows, a partition plate disposed in the casing, and oppositely disposed guide flanges formed on the lower edge of the partition plate, as and for the purpose specified.

3. A railroad car attachment comprising a casing of substantial triangular-shape in plan embodying a pair of diverging side walls, attaching means carried by the side walls and the wings struck in from said side walls.

4. A railroad car attachment comprising a casing of substantial triangular configuration in plan comprising a triangular-shaped top wall, diverging side walls, a partition plate disposed between the side walls and wings struck out from the side walls and extending into the casing toward said partition plate.

In testimony whereof I affix my signature in presence of two witnesses.

EARNEST J. SIMPSON.

Witnesses:
   STEPHEN B. DALLEY,
   FLORENCE McCLAIN.